US008271359B2

(12) United States Patent
Mundell et al.

(10) Patent No.: US 8,271,359 B2
(45) Date of Patent: Sep. 18, 2012

(54) METHOD AND APPARATUS FOR PERMITTING ACCESS TO, TRACKING, AND REPORTING REAL TIME TRANSCRIPTIONS

(75) Inventors: Grover Mundell, Aurora, CO (US); Kevin S. Koch, Grand Junction, CO (US)

(73) Assignee: West Services, Inc., Eagan, MN (US)

( * ) Notice: Subject to any disclaimer, the term of this patent is extended or adjusted under 35 U.S.C. 154(b) by 1902 days.

(21) Appl. No.: 10/637,260

(22) Filed: Aug. 9, 2003

(65) Prior Publication Data

US 2005/0033697 A1   Feb. 10, 2005

(51) Int. Cl.
*G07B 17/00* (2006.01)
*G06F 15/02* (2006.01)
*G07F 19/00* (2006.01)
*H04M 15/00* (2006.01)
*G06Q 10/00* (2012.01)

(52) U.S. Cl. ............... 705/30; 705/32; 705/34; 705/342
(58) Field of Classification Search ...................... 705/34
See application file for complete search history.

(56) References Cited

U.S. PATENT DOCUMENTS

| 5,146,552 | A | | 9/1992 | Cassorla et al. | 715/234 |
|---|---|---|---|---|---|
| 5,437,013 | A | | 7/1995 | Rubin et al. | 395/200 |
| 5,537,526 | A | | 7/1996 | Anderson et al. | 715/209 |
| 5,671,428 | A | | 9/1997 | Muranaga et al. | 715/751 |
| 5,878,186 | A | * | 3/1999 | Bennett et al. | 386/85 |
| 5,884,256 | A | * | 3/1999 | Bennett et al. | 704/235 |
| 5,890,176 | A | | 3/1999 | Kish et al. | 715/205 |
| 6,065,026 | A | | 5/2000 | Cornelia et al. | 715/202 |
| 6,091,835 | A | | 7/2000 | Smithies et al. | 382/115 |
| 6,169,843 | B1 | | 1/2001 | Lenihan et al. | 386/46 |
| 6,282,510 | B1 | | 8/2001 | Bennett et al. | 704/235 |

(Continued)

OTHER PUBLICATIONS

Court Report, Management Plan for Court Reporting and Recording Services, United States Bankruptcy Court for the District of Hawaii, Apr. 1, 2003, 14 pages. Downloaded from http://www.hib.uscourts.gov/resources/HIB_CourtRptPlan.pdf on Dec. 1, 2008.*

*Primary Examiner* — Paul Danneman
(74) *Attorney, Agent, or Firm* — Pillsbury Winthrop Shaw Pittman LLP

(57) ABSTRACT

A device and method for permitting access to a real time data stream through prepayments or other payment arrangements and/or calculating a fee corresponding to usage of a real time data stream, wherein the real time data stream includes transcript data from a court transcription. In one example, a device may include a data collection device for receiving prepayment data, such as a code, key, token, pass that may contain purchase units therein; and a counter. In one embodiment, if the counter contains a value representing unused real time connections, then the data collection device permits the computing device to access to the real time data stream. In one example, the prepayment data includes a code containing a number representing a quantity of connections that may be made to the real time data stream. In another example, a method may include receiving the real time data stream; extracting one or more billing data elements from the real time data stream; storing said one or more billing data elements for processing; and calculating the fee based on at least one of the one or more billing data elements. In this way, charges may be calculated and levied or itemized according to the usage of such a real time service during a court proceeding such as a deposition.

27 Claims, 14 Drawing Sheets

U.S. PATENT DOCUMENTS

| | | | |
|---|---|---|---|
| 6,869,018 B2 | 3/2005 | Fifield et al. | 235/487 |
| 6,980,953 B1 * | 12/2005 | Kanevsky et al. | 704/235 |
| 7,631,343 B1 * | 12/2009 | Bennett et al. | 726/2 |
| 2002/0089470 A1 | 7/2002 | Raman et al. | 345/30 |
| 2003/0053486 A1 * | 3/2003 | Okamori | 370/474 |
| 2003/0152039 A1 * | 8/2003 | Roberts | 370/255 |

* cited by examiner

Example

Jones Deposition
2 Real-Time Connections
$20/Connection/Day

Example

Smith Deposition Transcript
3.5 Hours Of Real-Time Feed
ID# A46732
72 Pages, 25 Lines/Page
Rate: $0.02/Page
Real-Time Fee: $1.44

METHOD AND APPARATUS FOR PERMITTING ACCESS TO, TRACKING, AND REPORTING REAL TIME TRANSCRIPTIONS

FIELD OF THE INVENTION

The present invention relates, in general, to electronic transcription systems.

BACKGROUND OF THE INVENTION

Court reporters use stenographic devices in order to record shorthand notes of depositions, courtroom hearings, trials, or other proceedings. The stenographic notes taken by the court reporter are used to create transcripts of the particular court proceedings recorded by the court reporter. Conventionally, the stenographic notes can be converted into a readable text electronic document using computer aided transcription (CAT) software, typically in conjunction with a computer such as a laptop computer, so that the stenographic notes are transformed into, for example, a real-time stream of data or characters.

Computing devices may be provided so that attorneys or other participants in or outside of a court proceeding can monitor the real-time data stream from the court reporter's computing system.

However, not all court reporters provide real-time data streams to attorneys during a proceeding. As recognized by the present inventors, it may be beneficial to provide a mechanism for determining when a real-time data stream service is provided as part of the court reporting service. As recognized by the present inventors, what is needed is a method or apparatus for permitting access to, tracking, and reporting real time transcriptions, so that when appropriate in one example, charges may be levied or itemized according to the usage of such a real time service during a proceeding.

It is against this background that various embodiments of the present invention were developed.

SUMMARY OF THE INVENTION

In light of the above and according to one broad aspect of one embodiment of the present invention, disclosed herein is a device for providing access by a computing device to a real time data stream. In one example, the device includes a data collection device for receiving prepayment data, such as a code, key, token, pass that may contain purchase units therein; and a counter. In one embodiment, if the counter contains a value representing unused real time connections, then the data collection device permits the computing device to access to the real time data stream. In one example, the prepayment data includes a code containing a number representing a quantity of connections that may be made to the real time data stream.

According to another broad aspect of one embodiment of the invention, disclosed herein is a method for calculating a fee corresponding to usage of a real time data stream, wherein the real time data stream includes transcript data from a court transcription. In one example, the method includes receiving the real time data stream; extracting one or more billing data elements from the real time data stream; storing the one or more billing data elements for processing; and calculating the fee based on at least one of the one or more billing data elements. In this way, charges may be calculated and levied or itemized according to the usage of such a real time service during a court proceeding such as a deposition.

In another example, the one or more billing elements may include one or more of the following: a number of data bytes received during a real time data session; a time duration of a real time data session; a number of people attending a court proceeding; a number of people receiving the real time data stream; a number of connections to the real time data stream; a number of lines received during a real time data session; a number of pages received during a real time data session; a number of return characters received during a real time data session; and/or a number of page break characters received during a real time data session.

According to another broad aspect of one embodiment of the invention, disclosed herein is a device for calculating a fee corresponding to usage of a real time data stream. In one example, the device may include an input for receiving the real time data stream; a filter for extracting one or more billing data elements from the real time data stream; and storage for storing the one or more billing data elements for processing. The device may also include a billing module for calculating the fee based on at least one of the one or more billing data elements.

Other embodiments of the invention are disclosed herein. The foregoing and other features, utilities and advantages of various embodiments of the invention will be apparent from the following more particular description of the various embodiments of the invention as illustrated in the accompanying drawings and claims.

DETAILED DESCRIPTION

Disclosed herein are various embodiments of a device and method for permitting access to or calculating a usage fee of a real time data stream, for example a stream containing transcript data from a court transcription. A data collection or capture device collects or tracks prepayments, other payment data, or billing data elements so that access to the data stream may be provided or a fee corresponding to usage of a real time data stream may be tracked and reported. Various embodiments of the invention will be described.

Figure 1:
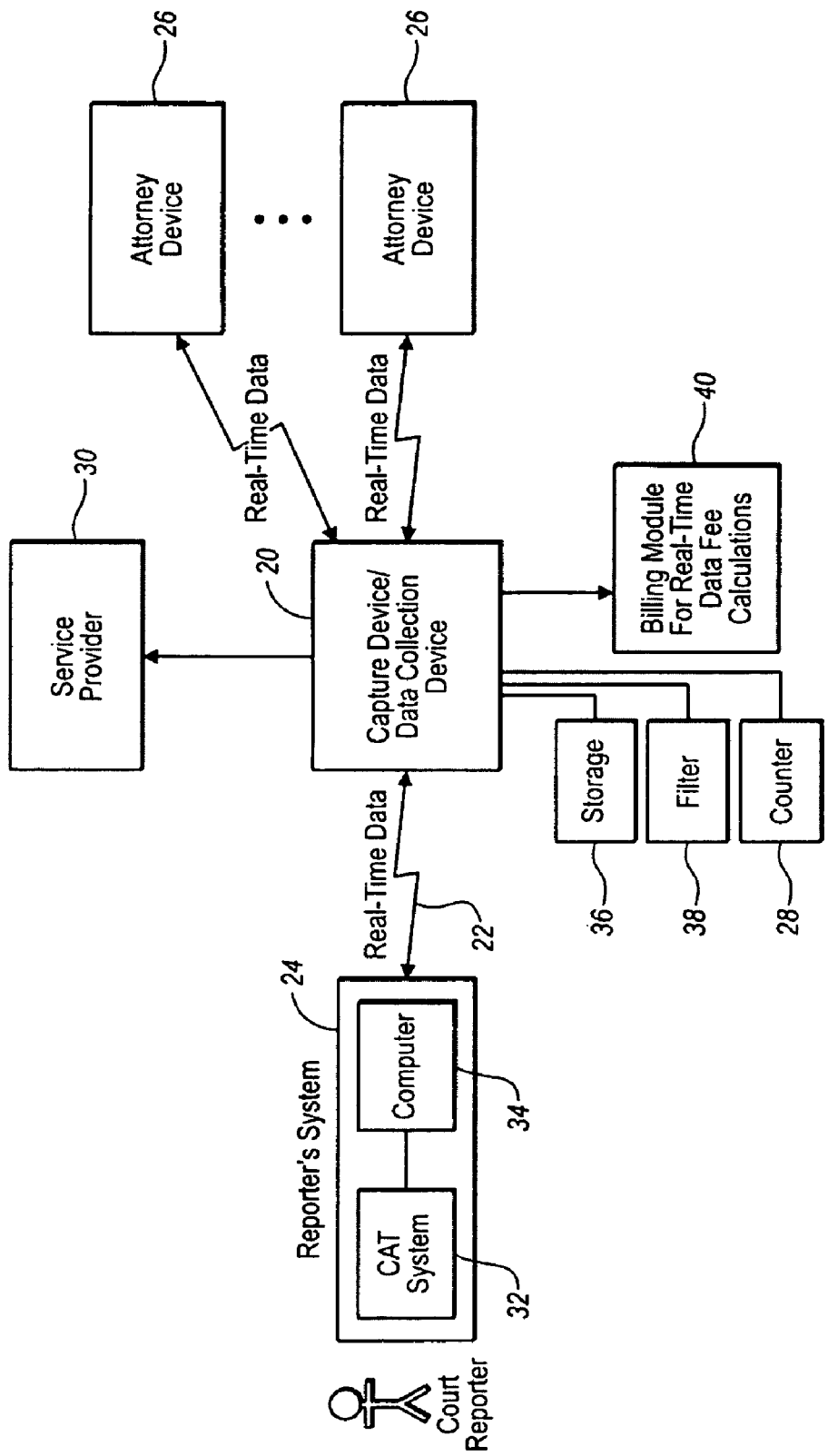
FIG. 1 illustrates a block diagram of an example of a capture/data collection device for use in a court reporting system, in accordance with an embodiment of the present invention.

According to one embodiment of the present invention, FIG. 1 illustrates a block diagram of a capture/data collection device 20 for collecting payment data in order to provide access to a real time data stream 22 and/or for monitoring the data streams that are transmitted. In one example, the real time data streams 22 are transmitted from a court reporter's computing system 24 to one or more devices 26 such as attorney devices (which could also be used by judges, clerks, clients, or others present at or interested in the real time transcript data).

In one example, the capture/data collection device 20 collects prepayment data in order to provide access to the real time data stream 22, and a counter 28 or other data structure may be used to store payment data. As described herein, prepayment data may include units or real time data sessions, connections or other quantities, values, or billing data elements purchased or allocated. In one example, the purchased units or quantities may be obtained from, or the usage fee may be invoiced or charged by, a third party 30 such as a service provider or licensing entity, or from the court reporter or other entity.

In one example, the capture/data collection device 20 monitors the real time data stream 22 and captures or derives from the real time data stream one or more billing data elements, such as the number of bytes of the data stream, the time duration of the data stream, the number of pages of the transcript streamed in real time data, or other billing data elements that may be used when calculating a fee or itemized charge that may be associated with the real time data stream service provided by the court reporter during the proceeding. In this way, the capture/data collection device 20 can be used to determine when a real time data stream session is being provided during a proceeding, and if so, the capture/data collection device can provide and perform various billing functions based on the characteristics of the actual real time data session.

A real time data session may include, for instance, one or more days or portions of days that are associated with the transcription of a proceeding (such as a court proceeding, a hearing, a trial, one or more depositions) during a portion of a day or spread over multiple days, or any other increment of time or sequence of events where real time data is provided from the court reporter's computing system.

Billing data elements may include, but not limited to, one or more data elements such as the number of bytes transmitted during the real time data session; the time duration of the real time data feed; the number of people attending the proceeding; the number of people receiving the real time feed (i.e., for instance, through an attorney device); the number of real time feeds or connections; the number of lines produced during the real time data session; the number of pages produced during the real time data session; the number of return characters produced during the real time data session; the number of page break characters present in the data stream of the real time data session; the sender's identification; the receiver's identification number, which may be expressed as a user identification number; and the date, time, and time zone where the proceeding took place.

As shown in FIG. 1, and by way of example only, a court reporter's computing system 24 may include a computer aided transcription system 32 coupled with a computer 34 to provide real time data streams 22 to one or more attorney devices 26. The real time data streams may be provided in the form of an RS232 serial data stream, a data stream provided over a parallel bus, a data stream provided over a universal serial bus, a data stream provided over a network connection such as a local area network or to the internet, or may be provided by wireless transmission.

In the example of FIG. 1, the attorney/user devices 26 receive the real time data stream for processing, display and manipulation thereon. The capture/data collection device 20 may also receive, over an input, the real time data stream of the proceeding and monitors the real time data stream to extract or derive billing data elements or other data from the real time data stream. In one example, the capture/data collection device has an input for receiving the real time data, a temporary or persistent storage element or device 36 for storing data including one or more billing data elements associated with a particular real time data session or project, and a filter 38 for filtering the real time data stream to extract or detect particular data elements.

The capture/data collection device 20 may also be provided with a billing module 40 for calculating the costs or charges associated with the real time data service provided during the proceeding.

Figure 2:
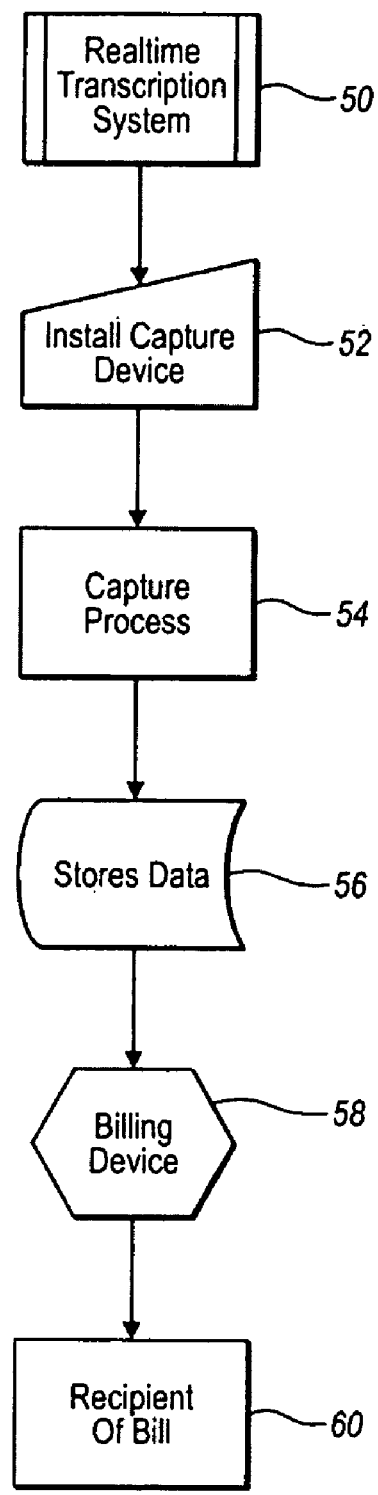
FIG. 2 illustrates an example of a method for tracking and reporting real time transcriptions, in accordance with an embodiment of the present invention.

Referring now to FIG. 2, an example of a method for tracking a reporting real time transcriptions is illustrated, in accordance with an embodiment of the present invention. At operation 50, a real time transcription system is established, and, in one example, may include a court reporter's computing system and one or more connections from the court reporter's computing system to another device such as an attorney's computing device. The real time transcription system permits the court reporter to take spoken word and convert it into text in real time or in near real time. The text is streamed from the reporter's computing device to one or more other devices, such as an attorney device, which is used to display and possibly manipulate the text of the transcription. At operation 52, a capture/data collection device may be installed or attached with the real time transcription such that the capture/data collection device can, in one example, receive and/or monitor the real time data stream. For instance, the capture/data collection device may be coupled with a serial data link connected between the court reporter's computing device and one or more attorney devices. The capture/data collection device may be connected to the real time transcription system via other connections, such as parallel connections, USB connections, network or LAN or internet connections, or wireless connections, for example. In one example, the capture/data collection device acts as a switch to pass the real time data stream upon receipt of payment data.

At operation 54, a capture process is performed for collecting payment data or capturing the real time data and extracting or deriving from the real time data one or more billing data elements that may be used in calculating or providing a charge or bill for the real time transcription service. In one example, the capture process 204 includes initializing the capture/data collection device, either automatically or manually, and obtains an identification which may be associated with the court reporter or this particular real time transcription session.

Alternatively, an identification may be associated with the real time data session or the particular capture/data collection device so that the charges or fees associated with the real time data session can be audited or tracked and payments credited against such identification associated with the real time data service. In one example, the capture/data collection device will read the stream of data from the reporter device, or from the attorney device, or from a service that connects the reporter device to an attorney device, or any combination thereof. In one example, the capture process at operation 54 includes extracting or deriving billing data elements from the captured data so that a charge or invoice may be calculated based, at least in part, on one or more of the billing data elements.

At operation 56, the data, which may include the billing data elements, may be logged into a table or other data structure for temporary or persistent data storage. For example, page breaks, bytes and byte counts, and other data elements which may include billing data elements, may be logged or stored.

At operation 58, a billing device may be provided either in conjunction with or separately from the capture/data collection device. The billing device, in one example, may calculate, based on one or more billing data elements, a fee or charge associated with the service of the real time data feed of transcription data. In one example, the billing device calculates the charge or fee and expresses it as a total dollar amount.

Preferably, the billing device sends the dollar amount, and may send other information, off to a designated location, such as an internet location, a network location, an e-mail address, an account or other location, so that a third party can track or be made aware of the dollar amount associated with the real time data stream service provided by the court reporter to the one or more particular attorneys at a particular proceeding or deposition. For instance, if a third party real time data stream service charges a licensing fee for the use of real time data streams between court reporters and attorneys during a deposition or other proceeding, then the billing device could, upon calculating the dollar amount associated with the particular real time data stream service, send the dollar amount calculated off to the third party via an e-mail or a TCP/IP message or other messaging mechanism.

In another example, a third party licensor may create accounts that court reporters or attorneys could create in order to transact business with the third party real time data stream licensor. In such accounts, units may be pre-purchased, or an invoice may be created, or a debit to a credit card may be utilized in order to pay for a particular real time data stream session. Preferably, the invoice would be received by the party responsible for payment at operation 60.

Figure 3:
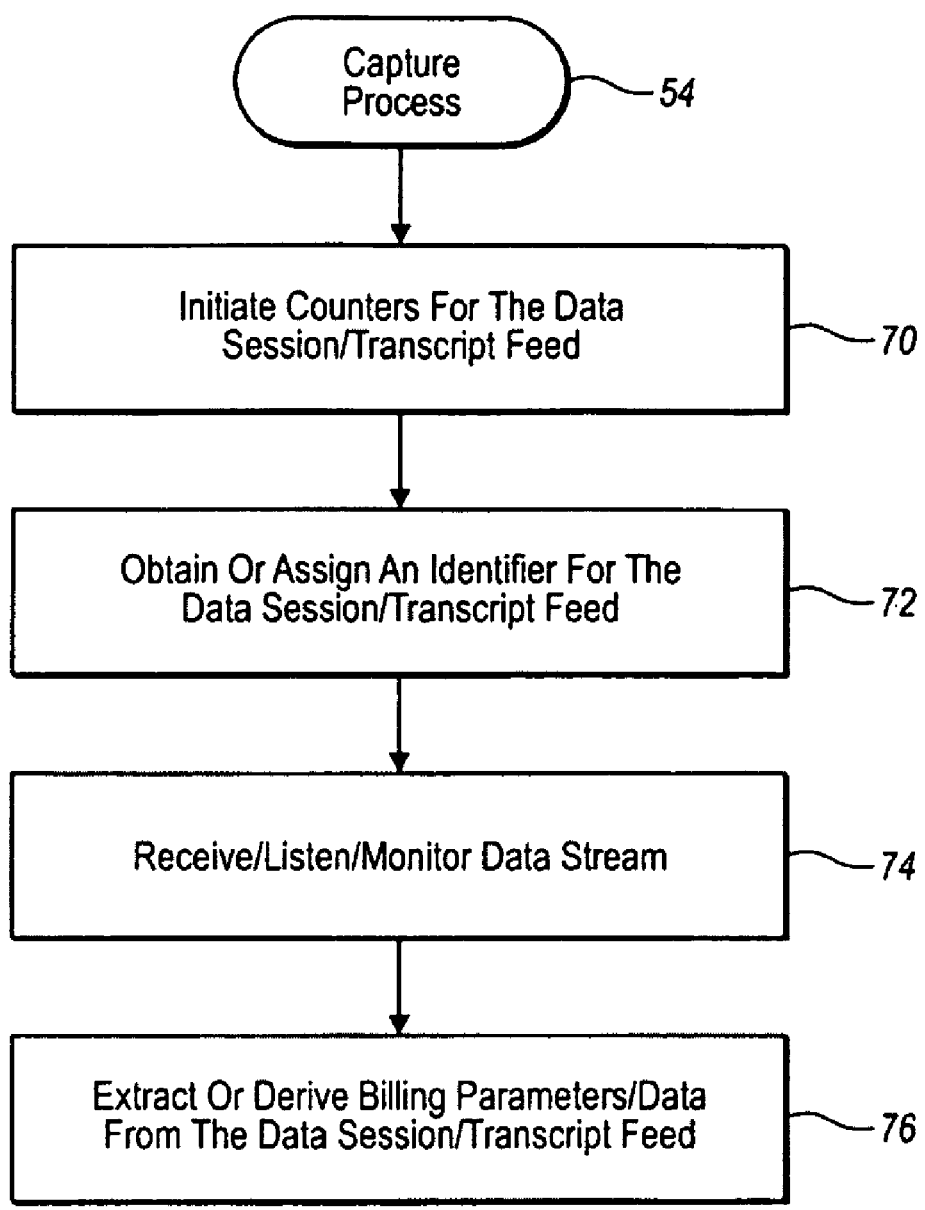
FIG. 3 illustrates an example of a method for capturing billing data elements, in accordance with an embodiment of the present invention.

Referring to FIG. 3, in one embodiment, the capture process 54 of FIG. 2 may include one or more operations 70-76 of FIG. 3. In FIG. 3 at operation 70, the capture/data collection device may maintain one or more counters for the data session or real time transcript fees, and at operation 70 these counters may be initiated, initialized, or reset. At operation 72, an identifier for the data session may be obtained or assigned to the data session, and this identifier may be selected or provided so as to assist a third party entity in auditing or monitoring the fees or charges generated by the real time data session. At operation 74, the capture/data collection device receives and monitors the data stream. In one example, the capture/data collection device may implement or include a data filter for selecting particular types of data or extracting particular types of data from the data stream.

At operation 76, in one embodiment, billing parameters or billing data are extracted or derived from the data stream or transcript feed. These billing parameters or billing data elements may include, for instance, the number of bytes transmitted during the data session, the time duration of the data session, the number of pages transcribed and transmitted in real time during the data session, or other billing data elements that may be used by the capture/data collection device or other module for calculating the fee or charge for the real time service.

Figure 4:
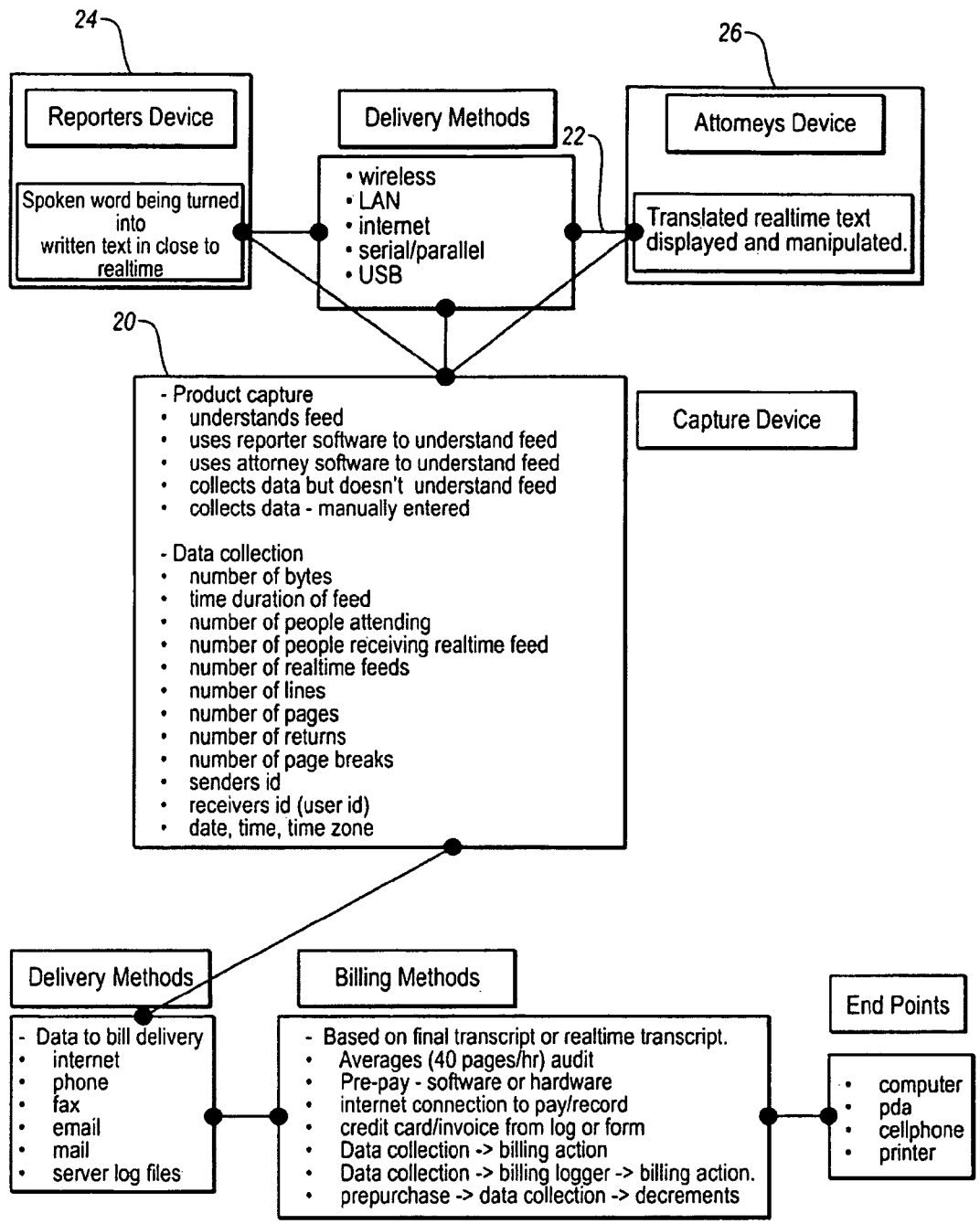
FIG. 4 illustrates another embodiment of a capture/data collection device for use in a court reporting system, in accordance with an embodiment of the present invention.

FIG. 4 illustrates another embodiment of the capture/data collection device 20 for use in a court reporting system, in accordance with an embodiment of the present invention. As illustrated in FIG. 4, the capture/data collection device 20 may receive the real time text from the reporter's device and captures that data, and/or may collect prepayment data or various billing data elements shown in FIG. 4. The capture/data collection device may be provided with a software module or components for understanding the real time data stream 22 from the reporter's device 24, or alternatively may use the reporter's software to understand the data feed. Alternatively, the capture/data collection device may use the attorney device 26 to process the real time data. Alternatively, the capture/data collection device may collect the real time data without necessarily understanding the components of the data, or in another example, the capture/data collection device may collect the data and components of the data may be manually entered into the capture/data collection device by, for instance, the court reporter.

The capture/data collection device 20 of FIG. 4 also may collect various billing data elements including, but not limited to, the number of bytes transmitted during the real time data session; the time duration of the real time data feed; the number of people attending the proceeding; the number of people receiving the real time feed (i.e., for instance, through an attorney device); the number of real time feeds; the number of lines produced during the real time data session; the number of pages produced during the real time data session; the number of return characters produced during the real time data session; the number of page break characters present in the data stream of the real time data session; the sender's identification; the receiver's identification number, which may be expressed as a user identification number; and the date, time, and time zone where the proceeding took place.

As shown in FIG. 4, the capture/data collection device 20 may utilize various methods for delivering a bill, charge, or invoice to the responsible party. In one example, one or more of the billing data elements collected by the capture/data collection device may be transmitted over a network such as the internet, by telephone, by facsimile, e-mail, postal service, overnight mail, or may be delivered to server log files for storage and processing therein.

Various billing methods may also be used, for example, the charge associated with a real time transcription session may be based on the real time transcript, may be based on a final transcript if desired, or connections may be prepurchased. In one example, an average data feed transcript rate may be used to calculate the number of pages involved during a real time session (i.e., an average of 40 pages per hour for a three hour transcription session would yield an estimated 120 pages of real time data feeds).

As mentioned above, the party responsible for payment, such as the attorneys in one example, may establish accounts with a third party real time data service, and such accounts may be prepaid using software or hardware, for an internet connection may be utilized to pay or record a transaction. A credit card may be used, and an invoice may be created from a log file of the billing data elements, or a form may be provided.

In one example, the collection of the billing data elements by the capture/data collection device 20 may result in a billing action, such as wherein the capture/data collection device calculates the charge or invoice associated with the real time data session. In another example, collection of the billing data elements by the capture/data collection device is logged into a log file, which results in a billing action therefrom. If units of service for real time data transcription are pre-purchased, then the billing data elements can be used to calculate how the pre-purchased units should be consumed or decremented based on the amount of usage during the real time data session.

Figure 5:
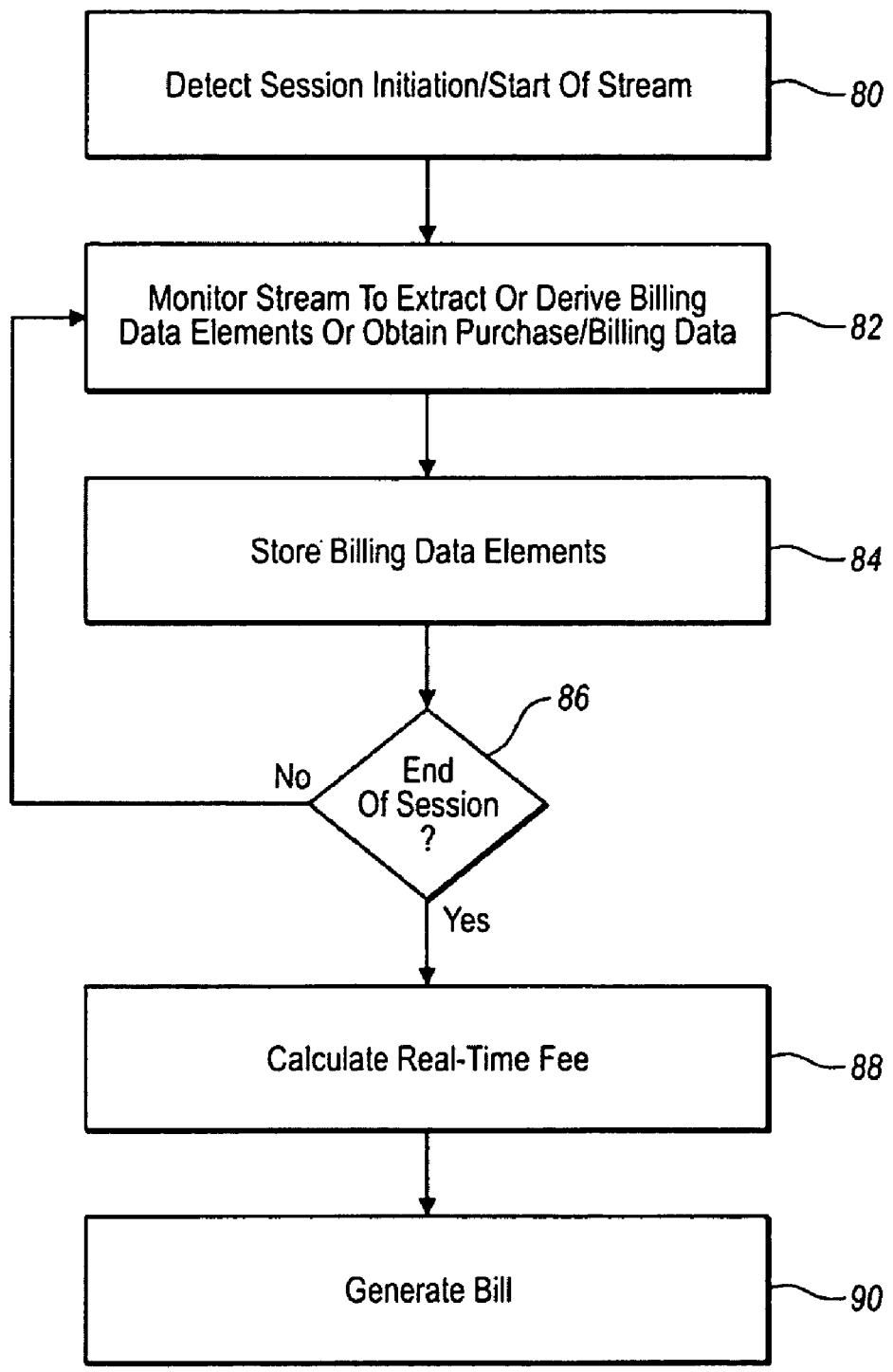
FIG. 5 illustrates another example of a method for capturing billing data elements, in accordance with an embodiment of the present invention.

The capture/data collection device 20 may be implemented as a hardware device or as software modules or both operating on the reporter's computing system, an attorney's computer, a general purpose computer coupled with the internet or other network, or a server or the like. FIG. 5 illustrates an example of a method for capturing billing data elements, in accordance with an embodiment of the present invention. One or more of the operations of FIG. 5 may be incorporated into a hardware device or software modules as desired depending upon the particular implementation.

At operation 80, the initiation of a data stream session is detected. In one example, the reporter's computing system may generate one or more special codes indicating the start of a real time data stream, and in this instance, operation 80 detects such codes. Alternatively, a start of a data session may be detected via user input (for instance, where the capture/data collection device resides as a software module or hardware module on the court reporter's computing system). In another example, the start of a data session is detected merely by the receipt of data from the reporter's device by the capture/data collection device. At operation 82, the real time data stream may be monitored to extract or derive one or more billing data elements and/or purchase or billing data such as prepurchase data may be collected. These billing data elements may include, but are not limited to, one or more of the billing data elements described with reference to FIG. 4, such as the number of bytes during the real time data session, the time duration of the real time data session, the number of lines or number of pages of the real time data session, etc.

At operation 84, the billing data elements are temporarily or persistently stored, such as through a log file, a table, or other data structure. Operation 86 determines whether the end of the session has been reached, and if so, control is passed to operation 88 which calculates a fee associated with the particular real time data session. Operation 86 loops to operation 82 until the end of a session is detected. The end of the session may be detected via user input (for instance, via input from the court reporter) or through detection of one or more characters of the data stream which indicate or correspond to an end of a session.

As mentioned above, the fee or itemized charge for the real time data session may be based on a number of factors, including one or more of the data billing elements as well as various pricings or ratios. Having calculated the real time fee, operation 90, in one example, generates a bill if needed which may be provided to the responsible party for payment.

Figure 6:
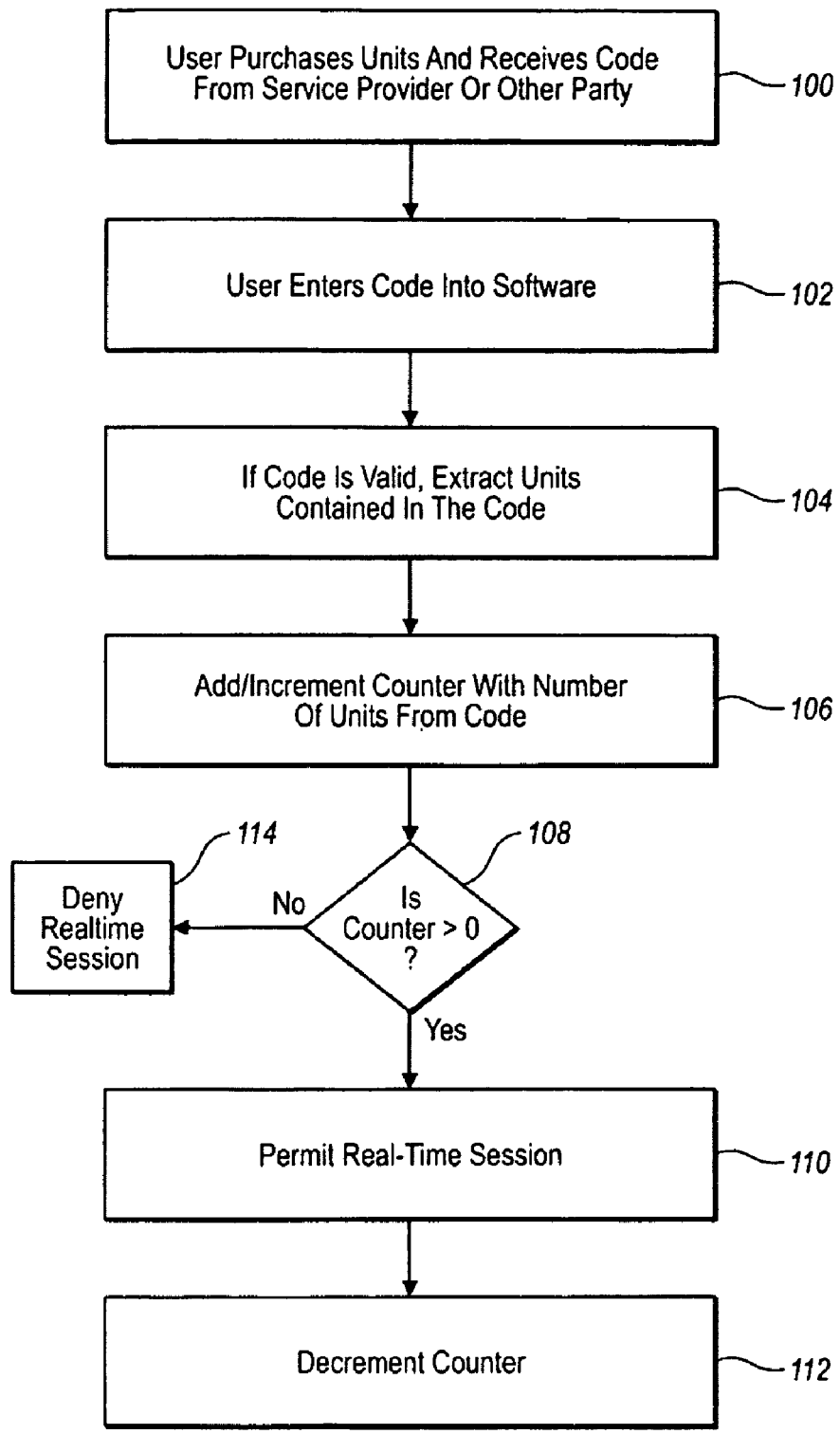
FIG. 6 illustrates an example of the logical operations for pre-purchasing real time sessions, in accordance with an embodiment of the present invention.

Referring to FIG. 6, FIG. 6 illustrates an example of logical operations for pre-purchasing real time data sessions, in accordance with an embodiment of the present invention. At operation 100, a user may purchase a number of real time sessions, either individually, or in bundles, from a service provider or court reporter or other entity, the user is provided with a key, code, or pass which includes the pre-purchased quantities of real time data sessions. In this regard, quantities of real time data sessions may be expressed in or by one or more of the following: number of pages, lines, real time connections, time durations, return characters, page break characters, date ranges, time periods, number of software run times, billing data elements, or any combination thereof. For example, a user may pre-purchase a quantity of real time transcription pages that the user can receive for the purchase price, or in another example, the user may purchase a number of real time connections which may be valid for certain periods of time (i.e., one day, two days, five days, thirty days, sixty days, one year, for example) or may be valid for certain date ranges or time periods (i.e., 24 hours per purchased unit).

At operation 100, the code provided by the service provider or other entity contains information about the quantity of sessions purchased by the user. In one example, the code is encoded with data that is unique or uniquely identifies the user or the user's computer. Such information may include, but is not limited to, a serial number from the computer software of the user's computer, a randomly generated number stored in the registry of the user's computer, a date and time that the user's software was installed, a global user identification number, and this information may be persistently valid or temporarily valid in which case the code provided by the service provider may also be persistently valid or temporarily valid. In another example, the unique information may relate to one or more pieces of personal information about the attorney or the user, such as a social security number, a user account number, etc. Preferably, the code provided by the service provider or other entity is encoded, and the user may purchase the code from the service provider in a number of ways, including via telephone conversation with the service provider or via a web page or e-mail, for example.

At operation 102 of FIG. 6, having received the code that includes representations of the number of units purchased by the user, the user enters the code (i.e., into software) in order to initiate receipt of real time data. At operation 104, a determination is made whether the code is valid, and if so, an extraction operation extracts the number of units purchased that is represented in the code. In one example, the software decodes the code and extracts the number of sessions or other units that are present in the code and then adds that value to a counter stored locally by the software on the user's computer. Hence, at operation 106, the software may add or increment (as an example) the counter with the purchase data or number of units represented within the code. Other counting techniques may be employed using other indicators or positive or negative values.

At decision operation 108, if the software determines that the counter is greater than zero (as an example) then control is passed to operation 110 wherein the software permits the user to receive a real time data session. In one example, operation 110 opens or controls a serial port or USB port or other data port of the computer and configures the port for receiving real time streams from the court reporter's computing system. At operation 112, having initiated the real time session, the counter may be decremented (as an example) to represent that the user has utilized or used one of the sessions or units that was purchased at operation 100.

If, however, operation 108 determines that the counter is not greater than zero (as an example) or that the number of remaining units is zero or has expired, then at operation 114, the software denies the real time session until the user reloads the software with a valid code containing one or more additional purchased units.

Figure 7:
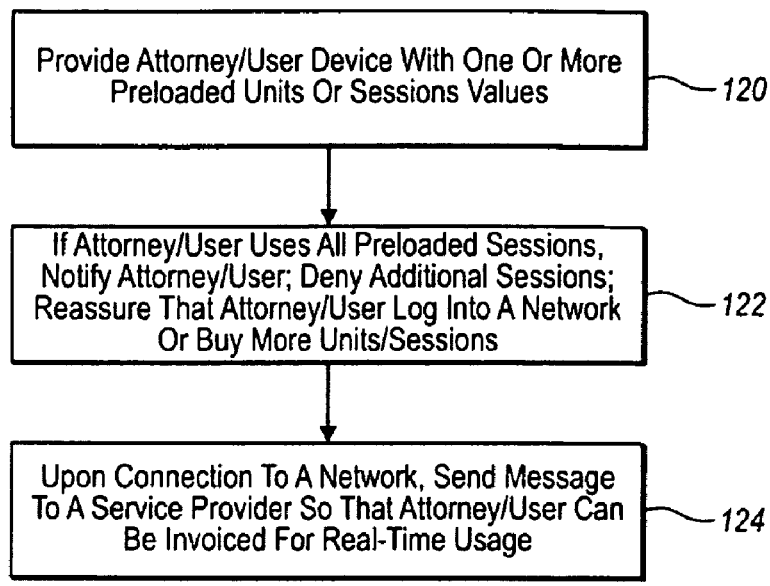
FIG. 7 illustrates an example of logical operations for pre-loading software or hardware with one or more real time data sessions, in accordance with an embodiment of the present invention.

Another embodiment is illustrated in FIG. 7 wherein the user device, such as the attorney device, can be preloaded with one or more units or session values so that if a user or attorney forgets or is unable to purchase a unit or session, the user or attorney may be able still to receive real time data during a proceeding. At operation 120, the user or attorney device is provided with one or more preloaded session values or units. As with operation 100 in FIG. 6, these session values or units may represent a multitude of different purchased values, such as number or real time pages which may be received, a number of real time connections, time ranges or date ranges, etc. The attorney or user may then utilize these preloaded values or units as needed if the attorney is unable to purchase units from the service provider or if the number of units that the attorney has purchased has been consumed or expired.

At operation 122 of FIG. 7, if the attorney uses all of the preloaded session values or units, then in one example, the attorney is notified (i.e., via a display screen or other notification technique) and in one example, any additional real time sessions that the user or attorney attempts are denied. In one example, operation 122 requires that the user or attorney log into a network or buy additional units or sessions.

At operation 124, upon connection to the network, a message or notification may be sent to the service provider so that the attorney can be invoiced for the real time session usage that the attorney utilized with the one or more preloaded session units or values.

In accordance with embodiments of the present invention, users such as attorneys may pre-purchase units/real time data sessions from the service provider. Alternatively, a court reporter may purchase multiple sessions that the court reporter may then distribute to users such as attorneys during a proceedings.

In one example, the user such as an attorney contacts the service (for example, via telephone, network connection, fax, in person, email, web page data input, messaging, or other communication means) for pre-purchasing number of units, sessions, connections, or other quantity and provides the service with unique information (such as information unique to the individual (i.e., social security number, personal account number, user identification) and/or information unique the user's computer (i.e., serial number, global user identification, etc.). Using the unique information received, the service generates a code which includes this information along with the number of units, sessions, connections, or other quantity purchased. The service provides the code to the user, for instance by telephone, network connection, fax, in person, email, web page data input, messaging, or other communication means), and the user uses the code to access the real time data stream. The capture/data collection device (which as mentioned herein may be hardware of software or both resident in the court reporters computing system or the attorney device or therebetween) decodes the code by using the unique information to decode the code, and the capture/data collection device permits the user to access the real time data stream.

Figure 8:
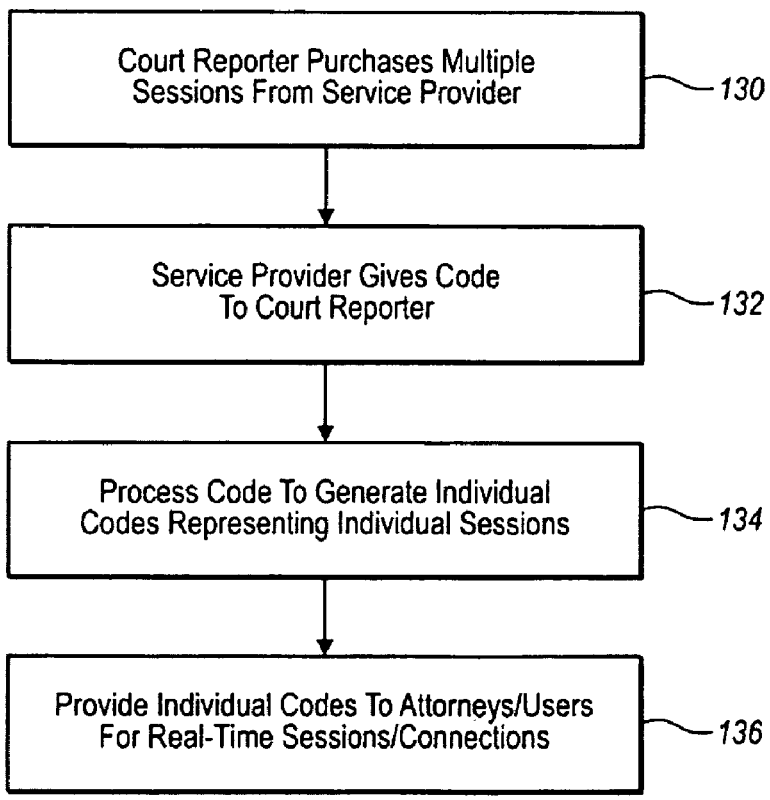
FIG. 8 illustrates an example of the logical operations for a court reporter to pre-purchase multiple real time sessions that may be then distributed to other individuals such as attorneys, in accordance with an embodiment of the present invention.

FIG. 8 illustrates an example of logical operations for purchasing multiple sessions and distributing individual sessions therefrom. At operation 130, the court reporter or other entity purchases multiple sessions or units from the service provider or other party. In one example, the service provider provides a key, pass, code, token, or other data to the reporter that contains or represents a number of sessions or units at operation 132. For example, a court reporter will be transcribing a one day deposition where two attorneys each wish to receive a real time data stream, the court reporter may purchase two units or sessions or connections and the service provider can provide a single code which represents the two units.

At operation 134, the code provided to the court reporter is processed to generate individual codes representing individual sessions, in one example. For instance, the court reporter may be provided with a software module which upon receipt of a code representing multiple sessions may generate individual codes representing individual sessions. In one example, the attorney's computer or the attorney individually provides a unique code or pass key to the court reporter, and the court reporter may use the unique information to derive the individual code for the attorney at operation 134. In one example, a counter is maintained at the court reporter's software which is incremented by the number of sessions purchased by the court reporter at operation 130, and is decremented for each individual code provided by the court reporter to the attorney. The individual code provided to the attorney may be encoded with the number of units designated for the individual attorney, for example at least one connection, unit, or real time session.

At operation 136, the court reporter provides each attorney with their individual codes so that each attorney may then receive real time data streams during the deposition or proceeding. In one example, the individual codes may be distributed to the attorneys or users programmatically or electronically over the serial link or other communications link. In one example, when the attorney enters the individual code into the attorney's computer, the attorney's computer decodes the individual code and extracts the quantity or units purchased that is represented within the code, for example as described at operations 104-114 of FIG. 6.

Figure 9:
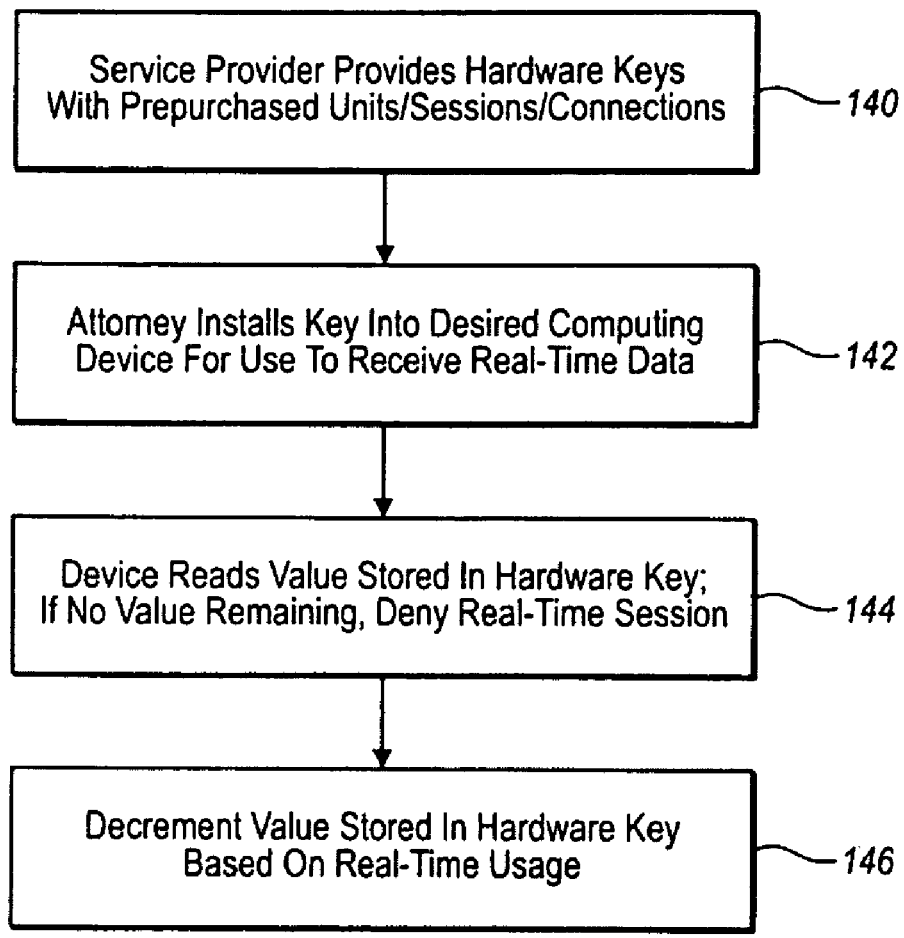
FIG. 9 illustrates an example of the logical operations for pre-purchasing of real time data sessions using a hardware key so that a single individual may utilize real time data sessions using different computers, in accordance with an embodiment of the present invention.

In addition to prepayment using software, prepayment may also be achieved using hardware, such as a hardware key which may be connectable to various different computing devices that a user such as an attorney may employ during different court proceedings. For instance, a hardware key can be loaded with a number of pre-purchased sessions, and then using the hardware key, the attorney can utilize the sessions or units stored on the hardware key at different computing devices as desired (i.e., the attorney's laptop computer, the attorney's desktop computer, the attorney's handheld computing device, the attorney's wireless telephone, or any other hardware device capable of communicating with the hardware key). FIG. 9 illustrates an example of the logical operations for pre-purchasing of real time data sessions using a hardware key so that a single individual may utilize real time data sessions using different computers, in accordance with an embodiment of the present invention.

At operation 140 of FIG. 9, the service provider or other entity provides a hardware key or keys with one or more pre-purchased sessions or units or connections for the user. In one example, the hardware key is a hardware device with a persistent memory portion for storing a counter or register or value representing the number of units available and stored on the hardware key.

At operation 142, the attorney or user installs the hardware key into the computing device or connects the hardware key with the computing device so that the computing device can be used to receive real time data. At operation 144, the attorney's computing device reads the value stored in the hardware device, and if no value is remaining the real time data session may be denied. Otherwise, if the value stored in the hardware key contained usable units, then the real time session is permitted and operation 146 decrements the value stored in the hardware key based upon the real time usage by the user.

In another example, the hardware key may be used for tracking usage (i.e., for post payment). For instance, the hardware key may track the number of units or sessions or connections used, or other billing data elements utilized by the use and the hardware key may provide such data of information to the service so that the user can be invoiced. Hence, the hardware key can track either credits or debits or both (i.e., positive of negative values).

Figure 10:
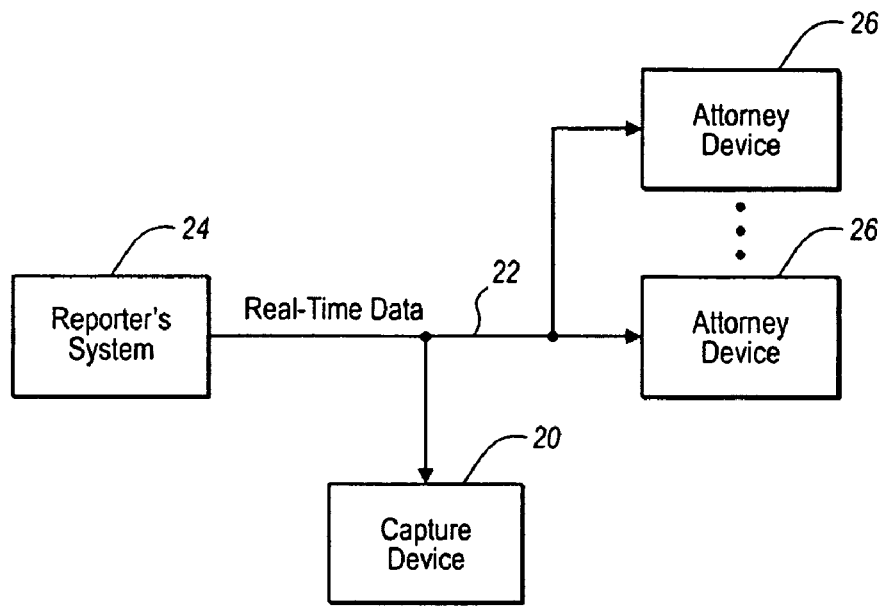
FIG. 10 illustrates another embodiment of a capture/data collection device for use in a court reporting system, in accordance with an embodiment of the present invention.
Figure 11:
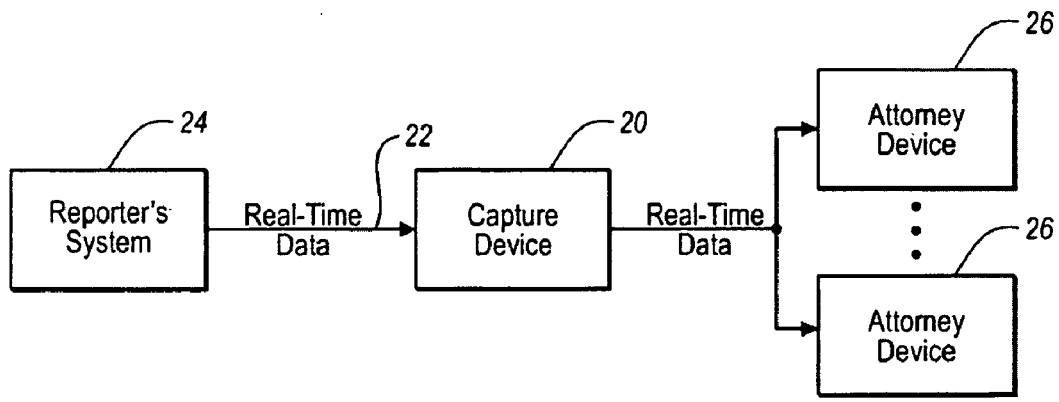
FIG. 11 illustrates another embodiment of a capture/data collection device for use in a court reporting system, in accordance with an embodiment of the present invention.

As mentioned above, the capture/data collection device may be implemented as a hardware device or as one or more software modules or both and accordingly may reside or be integrated with different components of a real time transcription network. Referring to FIG. 10, a capture/data collection device 20 may monitor or tap the communications link 22 between the court reporter's system and the attorney devices. In this example, the capture/data collection device may be a dedicated hardware device or may be a server or other computer programmed to perform one or more of the operations or functions described herein. In FIG. 11, the capture/data collection device 20 receives an inbound communication link from the reporter's system 24 for receiving real time data, and the capture/data collection device also provides an outbound data link for transmitting the real time data to one or more attorney devices. In this example, the capture/data collection device may be a dedicated hardware device which is capable of receiving and transmitting real time data (i.e., a gateway).

Figure 12:
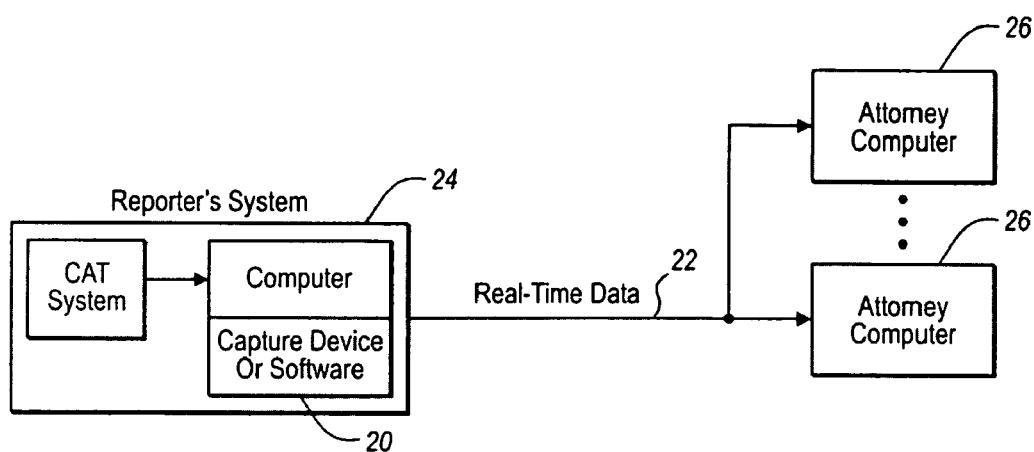
FIG. 12 illustrates another embodiment of a capture/data collection device for use in a court reporting system, in accordance with an embodiment of the present invention.
Figure 13:
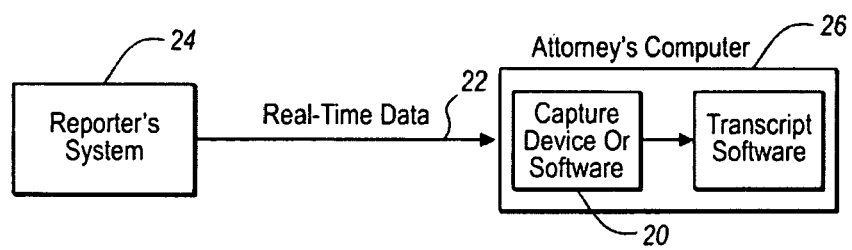
FIG. 13 illustrates another embodiment of a capture/data collection device for use in a court reporting system, in accordance with an embodiment of the present invention.

In FIG. 12, the capture/data collection device 20 or capture software operations may be provided or made integral with the reporter's computer system 24, as hardware or software. In FIG. 13, the capture/data collection device or software operations 20 may be incorporated or integrated with the attorney's computer hardware or software 26, and in one example, interacts with transcript software provided on the attorney's computer 26 for receiving, displaying and manipulating real time transcript data. In the examples of FIGS. 10-13, the capture/data collection device or software operations may include prepayment code/data collection and/or one or more software filters to extract billing data elements from the real time data stream, for example.

Figure 14:
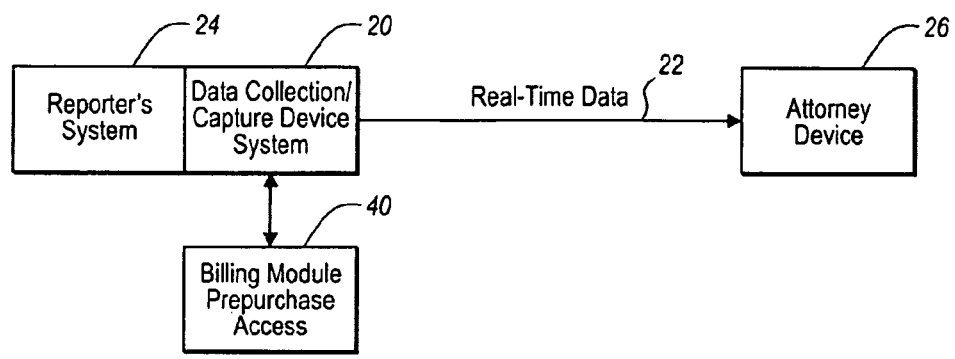
FIG. 14 illustrates another embodiment of a capture/data collection device incorporating pre-purchase access, in accordance with an embodiment of the present invention.

In FIG. 14, the data collection/capture device 20 is coupled with the reporter's system so as to control the real time data streams distributed to one or more attorneys. In one example, the data collection/capture device 20 may include a billing module which provides for pre-purchase access to real time data streams. In one embodiment, if there are no pre-purchased units, then the data collection/capture device denies the real time data session. In this example, the court reporter may pre-purchase the units, sessions, or connections from the service provider and once the court reporter has received the pre-purchased key, token, pass, code, or other data, and entered such data into the data collection/capture device, the reporter's system is activated in order to provide real time data streams to the one or more attorney devices attached thereto.

Figure 15:
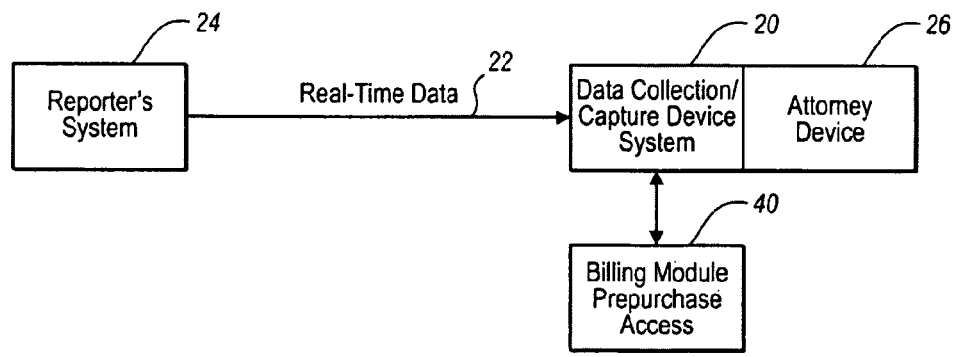
FIG. 15 illustrates another embodiment of a capture/data collection device incorporating pre-purchase access, in accordance with an embodiment of the present invention.

In FIG. 15, the attorney device 26 may be provided with a data collection/capture device coupled with a billing module which permits the receipt of real time data streams only after the attorney enters a code, key, token, pass or other data into the attorney's computing device, in one example. As described above, the attorney device may be provided with a number of preloaded units so that in the event that the attorney has not purchased or is not able to obtain a code, the attorney may still participate or receive a real time data stream, in one example.

Figure 16:
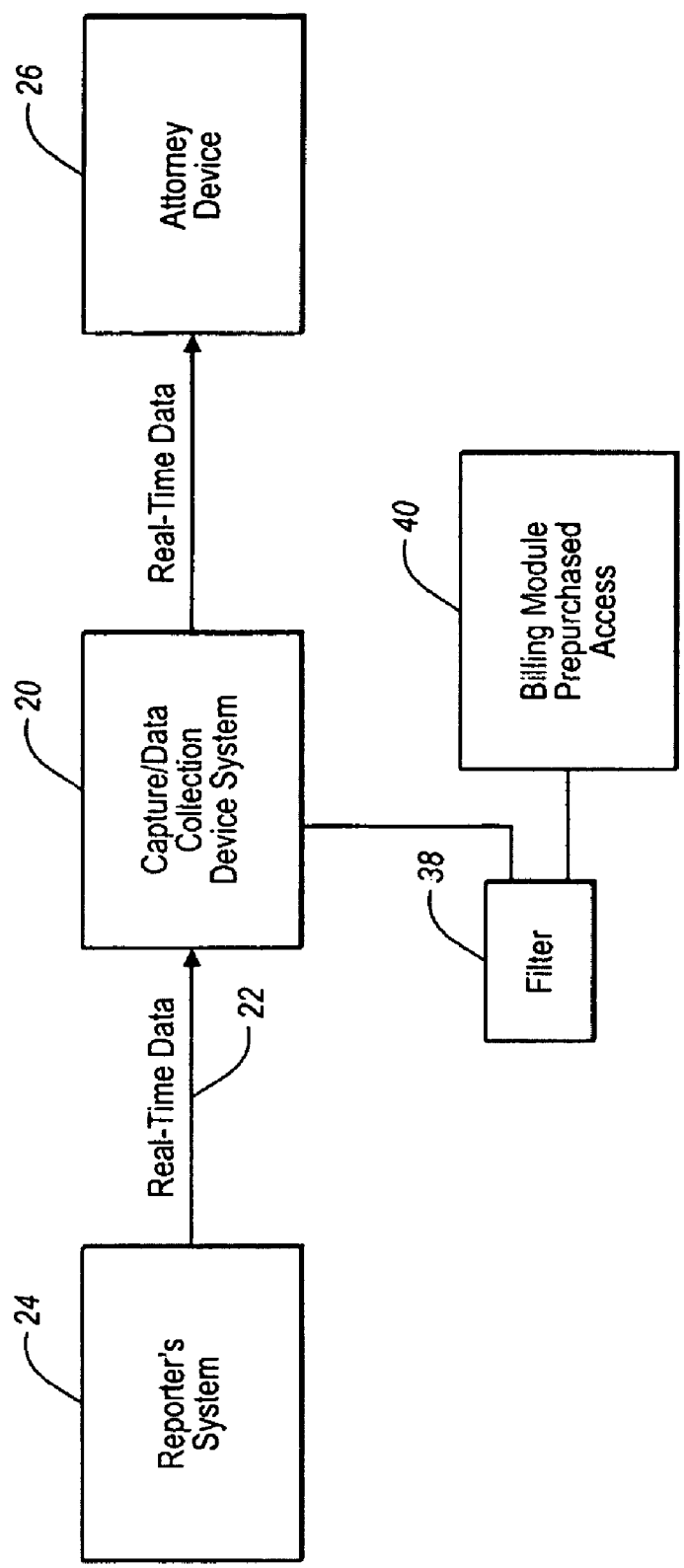
FIG. 16 illustrates another embodiment of a capture/data collection device incorporating pre-purchase access, in accordance with an embodiment of the present invention.

In FIG. 16, a capture/data collection device 20 is provided to both receive and transmit real time data 22 and may include a filter and a billing module 40 for pre-purchased access. In one example, the capture/data collection device permits the transmission of a real time data stream between the court reporter and the attorney device if a pre-purchase code is entered into the data collection device; or if a code is not provided, then the capture device may generate an invoice to the attorney or to the court reporter, or the capture device may interpret the real time data stream in order to extract or derive one or more billing parameters therefrom, as described above.

Figure 17:
FIG. 17 illustrates an example of billing data elements captured or collected by an example of a capture/data collection device, in accordance with an embodiment of the present invention.

In FIG. 17, an example of a real time fee 150 is illustrated, wherein during the Jones depositions, two real time connections are desired and can be purchased for $20.00 per connection per day. Of course, other billing records may be used, such as charging by the line, page, number of users attending the sessions, etc., or any billing parameter described above.

Figure 18:
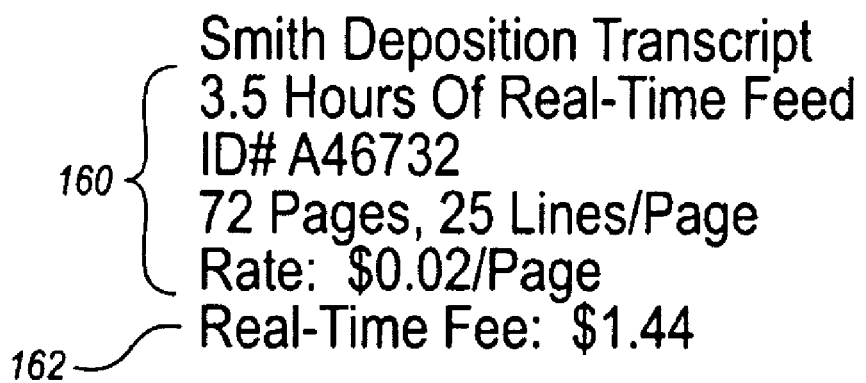
FIG. 18 illustrates an example of billing data elements captured by an example of a capture device, as well as an example of a real-time fee calculated based on the billing data elements, in accordance with an embodiment of the present invention.

Referring now to FIG. 18, an example of a few billing data elements 160 are illustrated in conjunction with an example of a real time calculated fee 162. As shown in FIG. 10, the "Smith Deposition Transcript" identifies the proceeding, along with identification number A46732. In this example, it is assumed that various billing data elements have been extracted from a real time feed of the Smith Deposition Transcript, including 3.5 hours of real time feed, 72 pages, 25 lines per page. If a rate of $0.02/page is used to calculate the real time fee, then the real time fee amounts to $1.44 in this example. It is understood that FIG. 10 is provided for illustrative purposes only, and an implementation of an embodiment of the present invention, different billing data elements may be extracted or derived or received by the capture/data collection device and various different metrics, ratios, formulas, or values may be used to calculate a real time fee.

Figure 19:
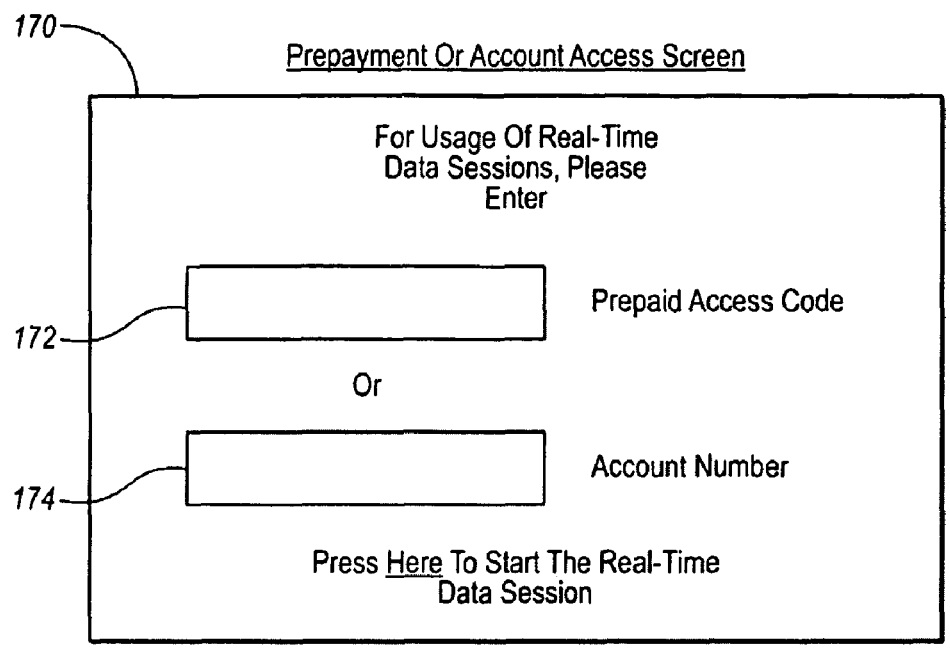
FIG. 19 illustrates an example of a prepayment or account access screen, in accordance with an embodiment of the present invention.

FIG. 19 illustrates an example of an access screen 170 which may be provided by the capture/data collection device 20 or any software module or hardware device of a user device, such as the court reporter's computing system 24 or the attorney's computing system 26, or any other user's computing system, in accordance with an embodiment of the present invention. As shown in FIG. 19, a data entry field 172 may be provided so that the user enters a prepaid access code, in one example. In another example, a data entry field 174 may be provided for entry of a user account number. In this way, upon receipt of valid prepaid access codes or account numbers, the capture/data collection device may then permit a real time data session to occur.

This application incorporates by reference U.S. patent application Ser. No. 09/920,443, filed Jul. 31, 2001, entitled "Transcript Management Software and Methods Therefor," which issued as U.S. Pat. No. 6,869,018 on Mar. 22, 2005, and U.S. patent application Ser. No. 10/060,898, filed Jan. 29, 2002, entitled "System, Method and Computer Program Product for Real-Time Data Streams of Stenographic Transcript Data," the disclosures of which are each hereby expressly incorporated by reference in their entirety.

Embodiments of the invention can be embodied in a computer program product. It will be understood that a computer program product including features of the present invention may be created in a computer usable medium (such as a CD-ROM or other medium) having computer readable code embodied therein. The computer usable medium preferably contains a number of computer readable program code devices configured to cause a computer to affect the various functions required to carry out the invention, as herein described.

While the methods disclosed herein have been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

While the invention has been particularly shown and described with reference to various embodiments thereof, it will be understood by those skilled in the art that various other changes in the form and details may be made without departing from the spirit and scope of the invention.

What is claimed is:

1. A capture and data collection device for permitting access to, tracking, and reporting a real-time transcriptions, wherein the capture and data collection device comprising is configured to:
   receive a real-time data stream from a court reporter computing system over a communications link that connects the capture and data collection device to the court reporter computing system, wherein the real-time data stream includes a unique identifier and court transcription data associated with a session between the court reporter computing system and the capture and data collection device;
   monitor the real-time data stream until the session between the court reporter computing system and the capture and data collection device has ended;
   extract one or more billing elements from the court transcription data in the monitored the real-time data stream until the session between the court reporter computing system and the capture and data collection device has ended;
   store the unique identifier associated with the session and the one or more billing elements extracted from the court transcription data in the monitored real-time data stream until the session between the court reporter computing system and the capture and data collection device has ended;
   calculate a fee associated with the real-time data stream based on the one or more stored billing elements when the session between the court reporter computing system and the capture and data collection device has ended; and
   bill the calculated fee to a party associated with the unique identifier.

2. The device of claim 1, wherein the one or more billing elements include a number of bytes in the court transcription data associated with the session.

3. The device of claim 1, wherein the one or more billing elements include a time duration associated with the session.

4. The device of claim 1, wherein the one or more billing elements include a number of people attending a court proceeding associated with the court transcription data.

5. The device of claim 1, wherein the one or more billing elements include a number of people that received the court transcription data associated with the session.

6. The device of claim 1, wherein the one or more billing elements include a number of connections to the real-time data stream communicated during the session.

7. The device of claim 1, wherein the one or more billing elements include a number of lines in the court transcription data associated with the session.

8. The device of claim 1, wherein the one or more billing elements include a number of pages in the court transcription data associated with the session.

9. The device of claim 1, wherein the one or more billing elements include a number of return characters in the court transcription data associated with the session.

10. The device of claim 1, wherein the one or more billing elements include a number of page break characters in the court transcription data associated with the session.

11. The device of claim 1, wherein the party associated with the unique identifier comprises an originator of the real-time data stream associated with the session.

12. The device of claim 1, wherein the unique identifier is assigned to the real-time data stream when the session is initiated.

13. A computer-implemented method for permitting access to, tracking, and reporting of a real-time transcriptions, comprising:
   receiving a real-time data stream from a court reporter computing system over a communications link, wherein the real-time data stream includes a unique identifier and court transcription data associated with a session initiated by the court reporter computing system;
   monitoring the real-time data stream until the session initiated by the court reporter computing system has ended;
   extracting one or more billing elements from the court transcription data in the monitored real-time data stream until the session initiated by the court reporter computing system has ended;
   storing the unique identifier associated with the session and the one or more billing elements extracted from the court transcription data in the monitored real-time data stream until the session initiated by the court reporter computing system has ended;
   calculating a fee associated with the real-time data stream based on the one or more stored billing elements when the session initiated by the court reporter computing system has ended; and
   billing the calculated fee to a party associated with the unique identifier.

14. The method of claim 13, wherein the one or more billing elements include a number of bytes in the court transcription data associated with the session.

15. The method of claim 13, wherein the one or more billing elements include a time duration associated with the session.

16. The method of claim 13, wherein the one or more billing elements include a number of people attending a court proceeding associated with the court transcription data.

17. The method of claim 13, wherein the one or more billing elements include a number of people that received the court transcription data associated with the session.

18. The method of claim 13, wherein the one or more billing elements include a number of connections to the real-time data stream communicated during the session.

19. The method of claim 13, wherein the one or more billing elements include a number of lines in the court transcription data associated with the session.

20. The method of claim 13, wherein the one or more billing elements include a number of pages in the court transcription data associated with the session.

21. The method of claim 13, wherein the one or more billing elements include a number of return characters in the court transcription data associated with the session.

22. The method of claim 13, wherein the one or more billing elements include a number of page break characters in the court transcription data associated with the session.

23. The method of claim 13, wherein the party associated with the unique identifier comprises a court reporter that generates the court transcription data using the court reporter computing system.

24. The method of claim 13, wherein the unique identifier is assigned to the real-time data stream when the court reporter computer system initiates the session.

25. The method of claim 13, further comprising obtaining the unique identifier from a hardware key associated with a device receiving the real-time data stream.

26. A system for permitting access to, tracking, and reporting real-time transcriptions, wherein the system comprises one or more devices configured to:
   start a session with a court reporter computing system having a computer aided transcription system to convert spoken word into text;
   receive a real-time data stream associated with the session from the court reporter computing system over a communications link, wherein the real-time data stream includes a unique identifier and the text converted from the spoken word;
   monitor the real-time data stream to extract one or more billing elements from the text converted from the spoken word until the session with the court reporter computing system has ended;
   calculate a fee associated with the real-time data stream based on the one or more billing elements when the session with the court reporter computing system has ended; and
   bill the calculated fee to a party associated with the unique identifier.

27. A computer-implemented method for permitting access to, tracking, and reporting real-time transcriptions, comprising:
   starting a session with a court reporter computing system having a computer aided transcription system that converts spoken word into text;
   receiving a real-time data stream associated with the session from the court reporter computing system over a communications link, wherein the real-time data stream includes a unique identifier and the text converted from the spoken word;
   monitoring the real-time data stream to extract one or more billing elements from the text converted from the spoken word until the session with the court reporter computing system has ended;
   calculating a fee associated with the real-time data stream based on the one or more billing elements when the session with the court reporter computing system has ended; and
   billing the calculated fee to a party associated with the unique identifier.

\* \* \* \* \*